United States Patent
Vienneau et al.

(10) Patent No.: US 7,596,764 B2
(45) Date of Patent: Sep. 29, 2009

(54) MULTIDIMENSIONAL IMAGE DATA PROCESSING

(75) Inventors: Christopher Vienneau, Montreal (CA); Michiel Schriever, Montreal (CA)

(73) Assignee: Autodesk, Inc., San Rafael, CA (US)

( * ) Notice: Subject to any disclaimer, the term of this patent is extended or adjusted under 35 U.S.C. 154(b) by 958 days.

(21) Appl. No.: 10/818,146

(22) Filed: Apr. 5, 2004

(65) Prior Publication Data

US 2005/0028101 A1    Feb. 3, 2005

(30) Foreign Application Priority Data

Apr. 4, 2003  (GB) .................................. 0307818.5

(51) Int. Cl.
| | |
|---|---|
| G06F 3/048 | (2006.01) |
| G06F 3/00 | (2006.01) |
| G06F 7/00 | (2006.01) |
| G06F 17/00 | (2006.01) |
| G06T 11/20 | (2006.01) |
| G06T 13/00 | (2006.01) |
| G06T 15/70 | (2006.01) |
| G09G 5/00 | (2006.01) |

(52) U.S. Cl. ................. 715/853; 715/716; 715/854; 707/104.1; 345/440; 345/473; 345/619

(58) Field of Classification Search ............ 715/716, 715/850, 852, 853, 854; 345/619, 419, 440, 345/473; 707/104.1
See application file for complete search history.

(56) References Cited

U.S. PATENT DOCUMENTS 4,488,245 A    12/1984   Dalke et al.
4,524,421 A    6/1985    Searby et al.

(Continued)

FOREIGN PATENT DOCUMENTS

CA    2066989    10/1992

(Continued)

OTHER PUBLICATIONS

Little, T.D.C., "Time-based Media Representation and Delivery," Multimedia Systems, J.F. Koegel Buford, ed., ACM Press, New York, 1994, pp. 175-200.

(Continued)

*Primary Examiner*—Mark K Zimmerman
*Assistant Examiner*—Fan Zhang
(74) *Attorney, Agent, or Firm*—Gates & Cooper LLP

(57) ABSTRACT

An apparatus for processing image data 603, 604 is provided, which comprises processing means 201, 202, memory means 205, 206, 207, display means 104 and manually operable input means 102, 103, 105, 106, wherein said memory means stores said image data and instructions 602, said image data and said instructions configure said processing means to perform the steps of outputting said image data to said display means as a hierarchical structure 603 of image data processing nodes 303, 401 to 413 having respective hierarchical properties 701, 702, 703, said structure being configured with a dimension. In response to selecting a plurality of said nodes by way of said input means, a group node 1301 is generated having hierarchical properties 701, 702, 703 processed (1103) from said respective properties. Said group node 1301 is output in said hierarchical structure 603. In response to selecting (1106) said group node 1301, said dimension is reconfigured (1107, 1501).

6 Claims, 15 Drawing Sheets

U.S. PATENT DOCUMENTS

| | | | |
|---|---|---|---|
| 4,538,188 A | 8/1985 | Barker et al. | |
| 4,558,302 A | 12/1985 | Welch | |
| 4,602,286 A | 7/1986 | Kellar et al. | |
| 4,641,255 A | 2/1987 | Hohmann | |
| 4,666,271 A | 5/1987 | Gonsot | |
| 4,677,576 A | 6/1987 | Berlin et al. | |
| 4,771,342 A | 9/1988 | Beesley | |
| 4,812,904 A | 3/1989 | Maring et al. | |
| 4,823,108 A | 4/1989 | Pope | |
| 4,935,816 A | 6/1990 | Faber | |
| 5,077,610 A | 12/1991 | Searby et al. | |
| 5,091,963 A | 2/1992 | Litt et al. | |
| 5,212,544 A | 5/1993 | Kellar et al. | |
| 5,216,755 A | 6/1993 | Walker et al. | |
| 5,289,566 A | 2/1994 | Walker et al. | |
| 5,319,465 A | 6/1994 | Squyres et al. | |
| 5,335,293 A | 8/1994 | Vannelli et al. | |
| 5,357,294 A | 10/1994 | Shimizu et al. | |
| 5,359,430 A | 10/1994 | Zhang | |
| 5,384,667 A | 1/1995 | Beckwith | |
| 5,392,072 A | 2/1995 | Rodriguez et al. | |
| 5,398,120 A | 3/1995 | Friedman et al. | |
| 5,420,801 A | 5/1995 | Dockter et al. | |
| 5,428,723 A | 6/1995 | Ainscow et al. | |
| 5,428,731 A | 6/1995 | Powers, III | |
| 5,430,878 A | 7/1995 | Straub et al. | |
| 5,434,958 A | 7/1995 | Surma et al. | |
| 5,442,751 A | 8/1995 | Patrick et al. | |
| 5,455,600 A | 10/1995 | Friedman et al. | |
| 5,459,529 A | 10/1995 | Searby et al. | |
| 5,659,382 A | 8/1997 | Rybczynski | |
| 5,659,793 A | 8/1997 | Escobar et al. | |
| 5,687,011 A | 11/1997 | Mowry | |
| 5,737,456 A | 4/1998 | Carrington et al. | |
| 5,786,824 A | 7/1998 | Sevigny | |
| 5,809,179 A | 9/1998 | Marimont et al. | |
| 5,856,665 A | 1/1999 | Price et al. | |
| 5,892,506 A | 4/1999 | Hermanson | |
| 6,111,578 A * | 8/2000 | Tesler | 715/850 |
| 6,269,180 B1 | 7/2001 | Sevigny | |
| 7,203,701 B1 * | 4/2007 | Packebush et al. | 707/103 Y |
| 2002/0051005 A1 * | 5/2002 | Trinh et al. | 345/619 |
| 2002/0199204 A1 | 12/2002 | Mory et al. | |
| 2004/0125124 A1 * | 7/2004 | Kim et al. | 345/716 |
| 2004/0186840 A1 * | 9/2004 | Dettinger et al. | 707/100 |

FOREIGN PATENT DOCUMENTS

| | | |
|---|---|---|
| EP | 0 360 599 A2 | 3/1990 |
| EP | 0 532 883 A1 | 3/1993 |
| EP | 0 718 796 A3 | 12/1996 |
| EP | 0 899 694 A1 | 3/1999 |
| WO | WO 87/02852 | 5/1987 |
| WO | WO 93/14591 | 7/1993 |
| WO | WO 95/20292 | 7/1995 |

OTHER PUBLICATIONS

Alpert, S.R. et al., "The EFX Editing and Effects Environment," IEEE Multimedia, Spring 1996, pp. 15-29.

Sephton, A.J. et al., "Segmentation of Synthetic-Aperture Radar imagery of sea ice," International Journal of Remote Sensing, vol. 15, No. 4, pp. 803-825, 1994.

* cited by examiner

| NODE ID | CHILD | PARENT | NODE TYPE | NODE NAME |
|---|---|---|---|---|
| 0001 | 0002:0014 | — | SCENE | SCENE |
| 0002 | 0003:0013 | 0001 | CAMERA | CAMERA |
| 0003 | 0004:007 | 0002 | KEYING | KEYING |
| 0004 | 0005 | 0003 | COLOR CORRECT | COLOR CORRECT |
| 0005 | — | 0004 | SOURCE | SOURCE |
| 0006 | 0007 | 0003 | COLOR CORRECT | COLOR CORRECT |
| 0007 | — | 0006 | SOURCE | SOURCE |
| 0008 | 0009:0013 | 0002 | LIGHTING | LIGHTING |
| 0009 | 0010 | 0008 | TEXTURING | TEXTURING |
| 0010 | — | 0009 | 3D OBJECT | 3D OBJECT |
| 0011 | 0012 | 0008 | TEXTURING | TEXTURING |
| 0012 | — | 0011 | 3D OBJECT | 3D OBJECT |
| 0013 | — | 0008 | PARTICLE | PARTICLE |
| 0014 | — | 0001 | AUDIO | AUDIO |
| ... | | | | |

*Figure 7*

MULTIDIMENSIONAL IMAGE DATA PROCESSING

CROSS-REFERENCE TO RELATED APPLICATIONS

This application claims the benefit under 35 U.S.C. §119 of the following co-pending and commonly assigned foreign patent application, which application is incorporated by reference herein:

United Kingdom Application No. 03 07 818.5, entitled "MULTIDIMENSIONAL IMAGE DATA PROCESSING", by Christopher Vienneau and Michiel Schriever, filed on Apr. 4, 2003.

This application is related to the following commonly assigned patent applications, all of which applications are incorporated by reference herein:

U.S. patent application Ser. No. 08/617,400, entitled "MULTITRACK ARCHITECTURE FOR COMPUTER-BASED EDITING OF MULTIMEDIA SEQUENCES", by David Hermanson, filed Mar. 18, 1996 (now U.S. Pat. No. 5,892,506 issued Apr. 6, 1999);

U.S. patent application Ser. No. 08/630,131, entitled "PROCESSING IMAGE DATA", by Benoit Sevigny, filed Apr. 10, 1996 (now U.S. Pat. No. 5,786,824 issued Jul. 28, 1998); and U.S. patent application Ser. No. 08/827,641, entitled "METHOD AND APPARATUS FOR COMPOSITING IMAGES", by Benoit Sevigny, filed Apr. 9, 1997 (now U.S. Pat. No. 6,269,180 issued Jul. 31, 2001).

FIELD OF THE INVENTION

The present invention relates to image data processing functions. More particularly, the present invention relates to an apparatus for processing image frames configurable to operate in a plurality of workspace dimensions and a method thereof.

DESCRIPTION OF THE RELATED ART

Systems for processing image data, having a processing unit, storage devices, a display device and manually operable input device (such as a stylus and touchtablet combination) are shown in U.S. Pat. Nos. 5,892,506; 5,786,824 and 6,269,180 all assigned to the present Assignee. In these aforesaid systems, it is possible to perform many functions upon stored image data in response to an operator manually selecting a function from a function menu.

Recently, in such systems as "TOXIC", "FIRE" and "INFERNO", licensed by the present Assignee, the number of functions that may be performed has increased significantly. Thus, for example, there has been a tendency towards providing functions for special effects, compositing and editing on the same processing system. In order to facilitate the concurrent representation of the diversity of such functions implemented to obtain final output image data, which are usually performed upon image data sequentially, final output data such as a released movie or broadcast is represented by scene graphs, wherein each of said functions is represented as a data processing "node" connected to many other such nodes, whereby said connections define said sequential order.

Having regard to the increasing processing capacity of modern image processing systems, it is now possible to edit and perform said functions within a three-dimensional ("3D") workspace, whereby the traditional representation of said scene graphs has been correspondingly altered to take into account this additional processing dimension. However, image artists have long been used to edit and perform image data processing functions within two dimensions ("2D") or in relation to the fourth time dimension ("4D"), such as when using timeline-based editing techniques. The respective, corresponding scene graphs of said 2D or 4D techniques differ substantially from said 3D scene graphs. Having developed dimension-specific skillsets, and in consideration of the fact that scene graphs usually include many thousands of nodes, image artists are therefore hampered in their workflow when having to perform functions in said 3D-based, modern image processing systems.

Furthermore, operators and artists are under increasing pressure to increase the rate at which work is finished. Being able to work with systems of this type quickly and efficiently is not facilitated if complex scene graph structures are provided that are not intuitive to the way artists work.

BRIEF SUMMARY OF THE INVENTION

According to a first aspect of the present invention, there is provided an apparatus for processing image data, comprising processing means, memory means, display means and manually operable input means, wherein said memory means stores said image data and instructions, said image data and said instructions configure said processing means to perform the steps of outputting said image data to said display means as a hierarchical structure of image data processing nodes having respective hierarchical properties, said structure being configured with a dimension; in response to selecting a plurality of said nodes by way of said input means, generating a group node having hierarchical properties processed from said respective properties; outputting said group node in said hierarchical structure; and in response to selecting said group node, reconfiguring said dimension.

According to another aspect of the present invention, there is provided a method of processing image data, said method comprising the steps of outputting image data to display means as a hierarchical structure of image data processing nodes having respective hierarchical properties, said structure being configured with a dimension; in response to selecting a plurality of said nodes, generating a group node having hierarchical properties processed from said respective properties; outputting said group node in said hierarchical structure; and in response to selecting said group node, reconfiguring said dimension.

According to yet another aspect of the present invention, there is provided a computer-readable medium having computer-readable instructions for processing image data executable by a computer such that, when executing said instructions, said computer will perform the steps of outputting image data to display means as a hierarchical structure of image data processing nodes having respective hierarchical properties, said structure being configured with a dimension; in response to selecting a plurality of said nodes, generating a group node having hierarchical properties processed from said respective properties; outputting said group node in said hierarchical structure; and in response to selecting said group node, reconfiguring said dimension.

BRIEF DESCRIPTION OF THE SEVERAL VIEWS OF THE DRAWINGS

FIG. 7 shows a portion of the scene graph shown in FIG. 6 as a dtabase stored in the memory shown in FIG. 2;

WRITTEN DESCRIPTION OF THE BEST MODE
FOR CARRYING OUT THE INVENTION

FIG. 1

Figure 1:
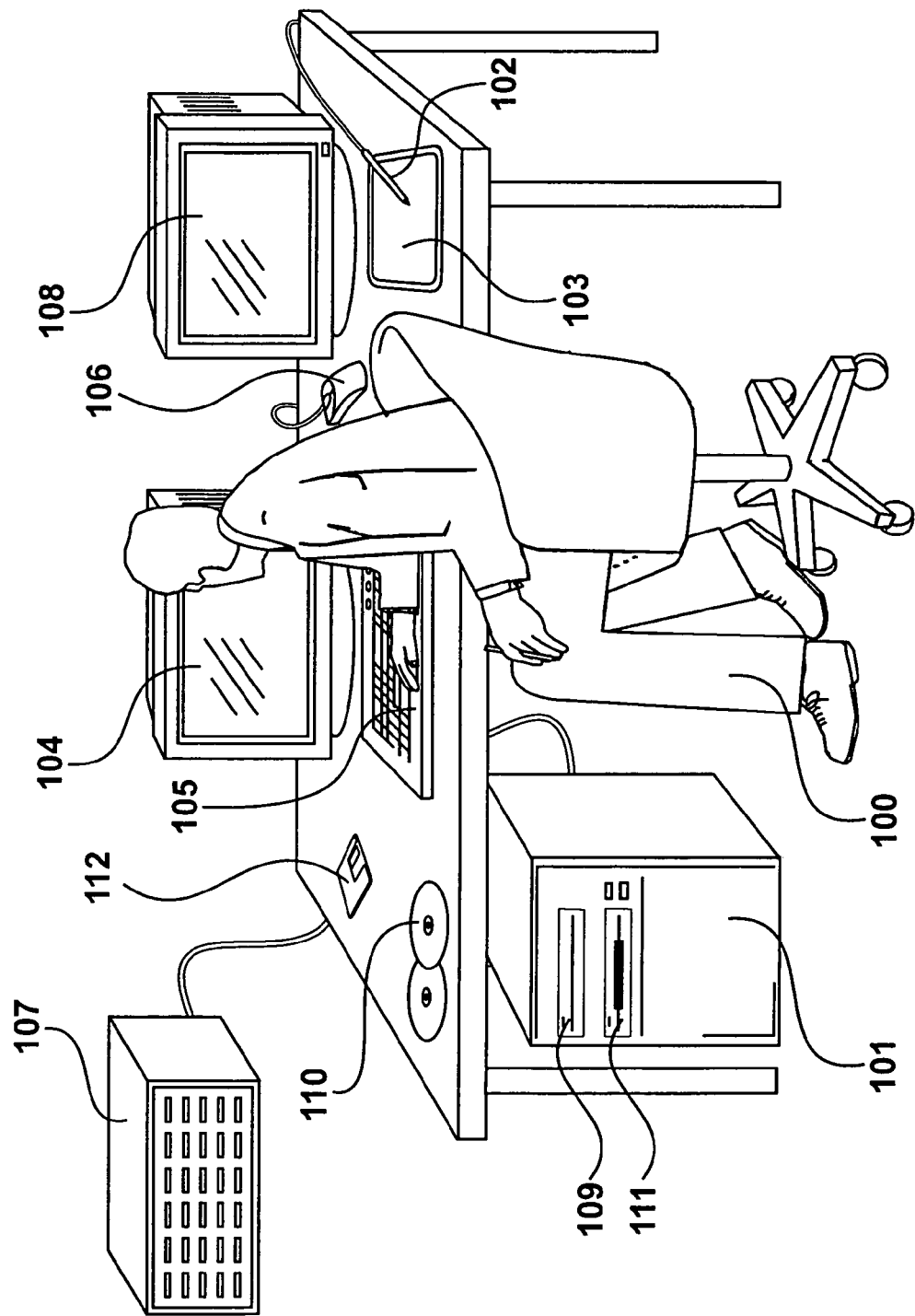
FIG. 1 shows a system for processing image data that embodies the present invention.

A computer editing system, including a computer system video display unit and a high-resolution monitor, is shown in FIG. 1.

In the system shown in FIG. 1, instructions are executed upon a graphics workstation operated by an artist 100, the architecture and components of which depends upon the level of processing required and the size of images being considered. Examples of graphics-based processing systems that may be used for very-high-resolution work include an ONYX II manufactured by Silicon Graphics Inc, or a multiprocessor workstation 101 manufactured by IBM Inc. The processing system 101 receives instructions from an artist by means of a stylus 102 applied to a touch tablet 103, in response to visual information received by means of a visual display unit 104. The visual display unit 104 displays images, menus and a cursor and movement of said cursor is controlled in response to manual operation of a stylus 102 upon a touch table 103. Keyboard 105 is of a standard alpha numeric layout and includes a spacebar. Manual operation of the spacebar on the keyboard 105 provides a first input command in a preferred embodiment resulting in a multilateral device being displayed at the cursor position, wherein said multilateral device identifies a function type at each of its sections, each having an associated displayable menu. Reference may be made to co-pending application Ser. No. 10/620,391, filed Jul. 16, 2003, entitled SELECTING FUNCTIONS VIA A GRAPHICAL USER INTERFACE, which is incorporated by reference herein, for a definition of said multilateral device, the teachings of which are incorporated herein for reference.

In response to a second input command, preferably received from the stylus 102, the cursor is moved over one of the edges of the displayed multilateral device. Thereafter, having moved the cursor over an edge of the multilateral device, the aforesaid menu associated with the edge over which the cursor has been moved is displayed. In this way, a user is given rapid access to a menu of interest without said menu being continually displayed over the working area of the VDU 104.

In addition, data may be supplied by said artist 100 via a mouse 106, with input source material being received via a real-time digital video recorder or similar equipment configured to supply high-bandwidth frame data.

The processing system 101 includes internal volatile memory in addition to bulk, randomly-accessible storage, which is provided by means of a RAID disk array or other framestore 107. Output material may also be viewed by means of a high-quality broadcast monitor 108. System 101 includes an optical data-carrying medium reader 109 to allow executable instructions to be read from a removable data-carrying medium in the form of an optical disk 110, for instance a DVD-ROM. In this way, executable instructions are installed on the computer system for subsequent execution by the system. System 101 also includes a magnetic data-carrying medium reader 111 to allow object properties and data to be written to or read from a removable data-carrying medium in the form of a magnetic disk 112, for instance a floppy-disk or a ZIP ™ disk.

FIG. 2

Figure 2:
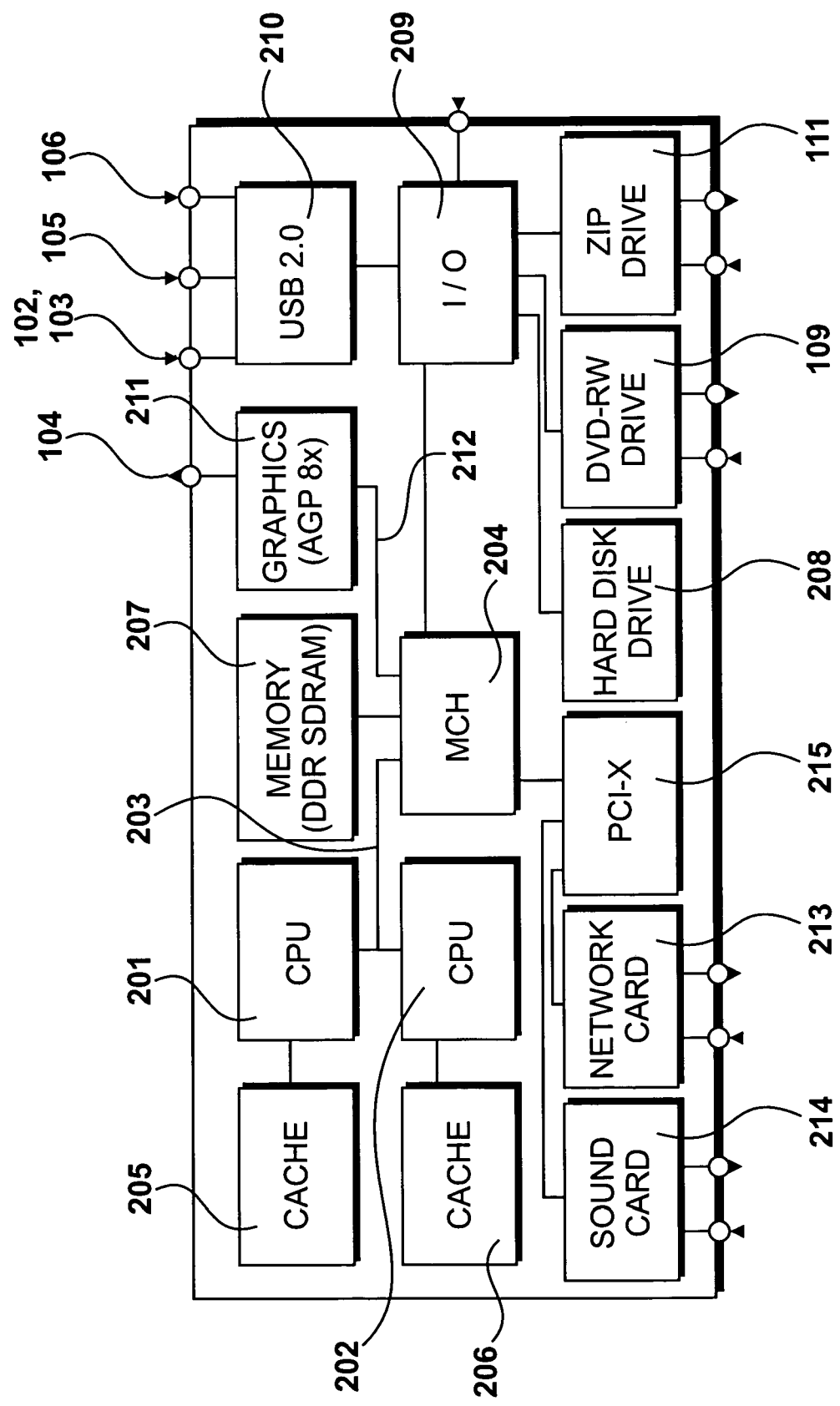
FIG. 2 details the hardware components of the computer system shown in FIG. 1, including a memory.

The components of computer system 101 are further detailed in FIG. 2 and, in the preferred embodiment of the present invention, said components are based upon Intel® E7505 hub-based Chipset.

The system includes two Intel® Pentium™ Xeon™ DP central processing units (CPU) 201, 202 running at three Gigahertz, which fetch and execute instructions and manipulate data with using Intel®'s Hyper Threading Technology via an Intel® E7505 533 Megahertz system bus 203 providing connectivity with a Memory Controller Hub (MCH) 204. CPUs 201, 202 are configured with respective high-speed caches 205, 206 comprising at least five hundred and twelve kilobytes, which store frequently-accessed instructions and data to reduce fetching operations from a larger memory 207 via MCH 204. The MCH 204 thus co-ordinates data flow with a larger, dual-channel double-data rate main memory 207, which is between two and four gigabytes in data storage capacity and stores executable programs which, along with data, are received via said bus 203 from a hard disk drive 208 providing non-volatile bulk storage of instructions and data via an Input/Output Controller Hub (ICH) 209. Said ICH 209 similarly provides connectivity to DVD-ROM re-writer 109 and ZIP™ drive 111, both of which read and write data and instructions from and to removable data storage media. Finally, ICH 209 provides connectivity to USB 2.0 input/output sockets 210, to which the stylus 102 and tablet 103 combination, keyboard 105 and mouse 106 are connected, all of which send user input data to system 101.

A graphics card 211 receives graphics data from CPUs 201, 202 along with graphics instructions via MCH 204. Said graphics accelerator 211 is preferably coupled to the MCH 204 by means of a direct port 212, such as the direct-attached advanced graphics port 8X (AGP 8X) promulgated by the Intel® Corporation, the bandwidth of which exceeds the bandwidth of bus 203. Preferably, the graphics card 211 includes substantial dedicated graphical processing capabilities, so that the CPUs 201, 202 are not burdened with computationally intensive tasks for which they are not optimised.

Network card 213 provides connectivity to other systems by processing a plurality of communication protocols, for instance a communication protocol suitable to encode and send and/or receive and decode packets of data over a Gigabit-Ethernet local area network. A sound card 214 is provided which receives sound data from the CPUs 201, 202 along with sound processing instructions, in a manner similar to graphics card 211. Preferably, the sound card 214 includes substantial dedicated digital sound processing capabilities, so that the CPUs 201, 202 are not burdened with computationally intensive tasks for which they are not optimised. Preferably, network card 213 and sound card 214 exchange data with CPUs 201, 202 over system bus 203 by means of Intel®'s PCI-X controller hub 215 administered by MCH 204.

The equipment shown in FIG. 2 constitutes a typical workstation comparable to a high-end IBM™ PC compatible or Apple™ Macintosh.

FIG. 3

Figure 3:
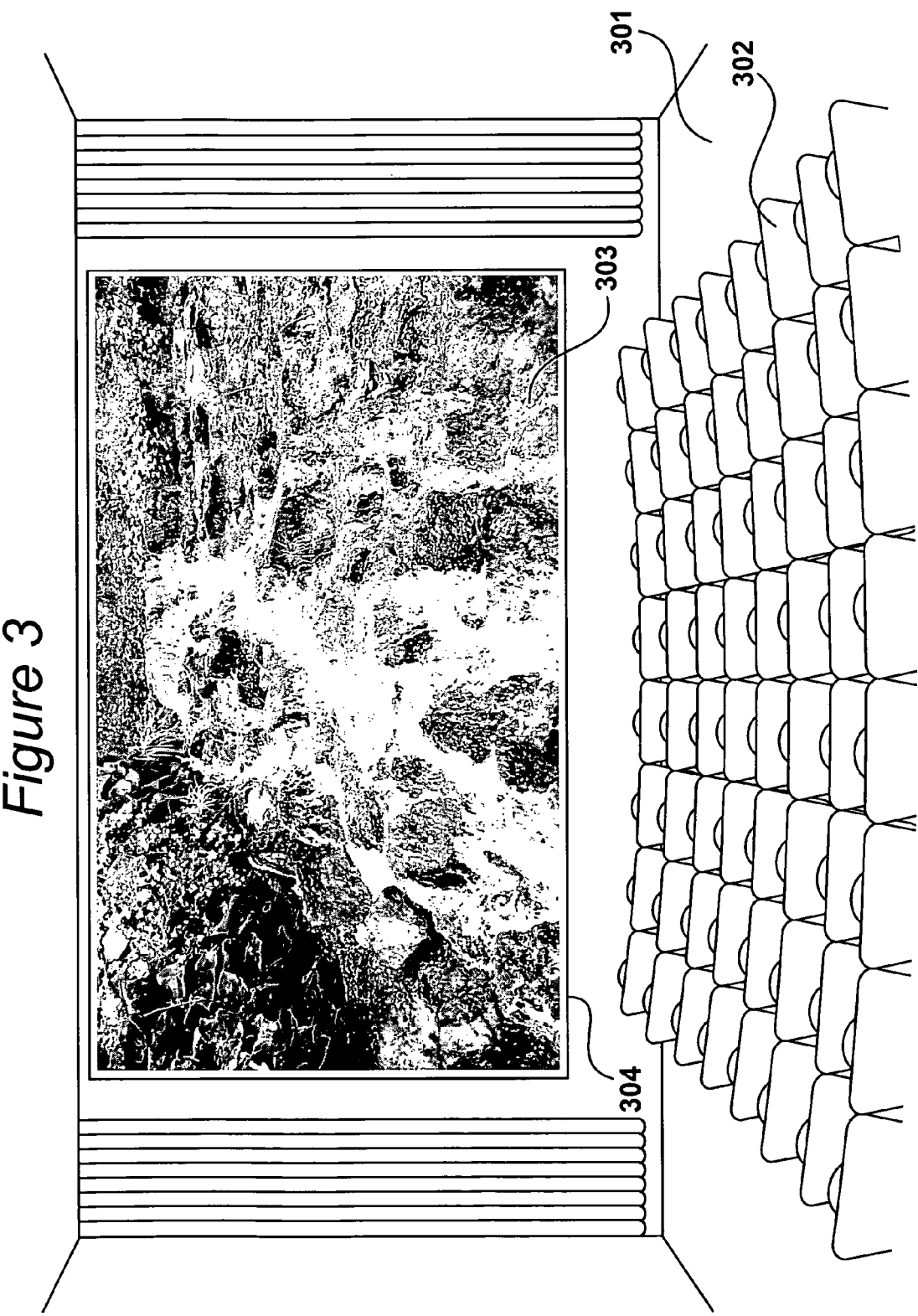
FIG. 3 illustrates a scene shown in a movie theatre comprising image data processed by the system shown in FIGS. 1 and 2.

A conventional movie theatre 301 is shown in FIG. 3, in which an audience 302 is watching a scene 303 projected onto a movie screen 304. Scene 303 comprises a sequence of many thousands of image frames having a very high resolution necessary to realistically portray the contents thereof when magnified by the projector onto screen 304, having regard to the amount of detail observable by audience 302 therein.

As was detailed in the introduction above, it is known to digitise each original image frame contributing to sequence 303 for the purpose of post-production editing and the implementation of image enhancements. In order to facilitate said editing and enhancements, various image data processing techniques have been developed to improve the interaction of an image editor therewith, and the workflow thereof. Specifically, one such technique involves the referencing of said digitised image frames and the various post-production processes applied thereto within a hierarchical data processing structure, also known as a process tree, whereby said image editor may intuitively and very precisely edit any component or object of any digitised image frame referenced therein.

FIG. 4

Figure 4:
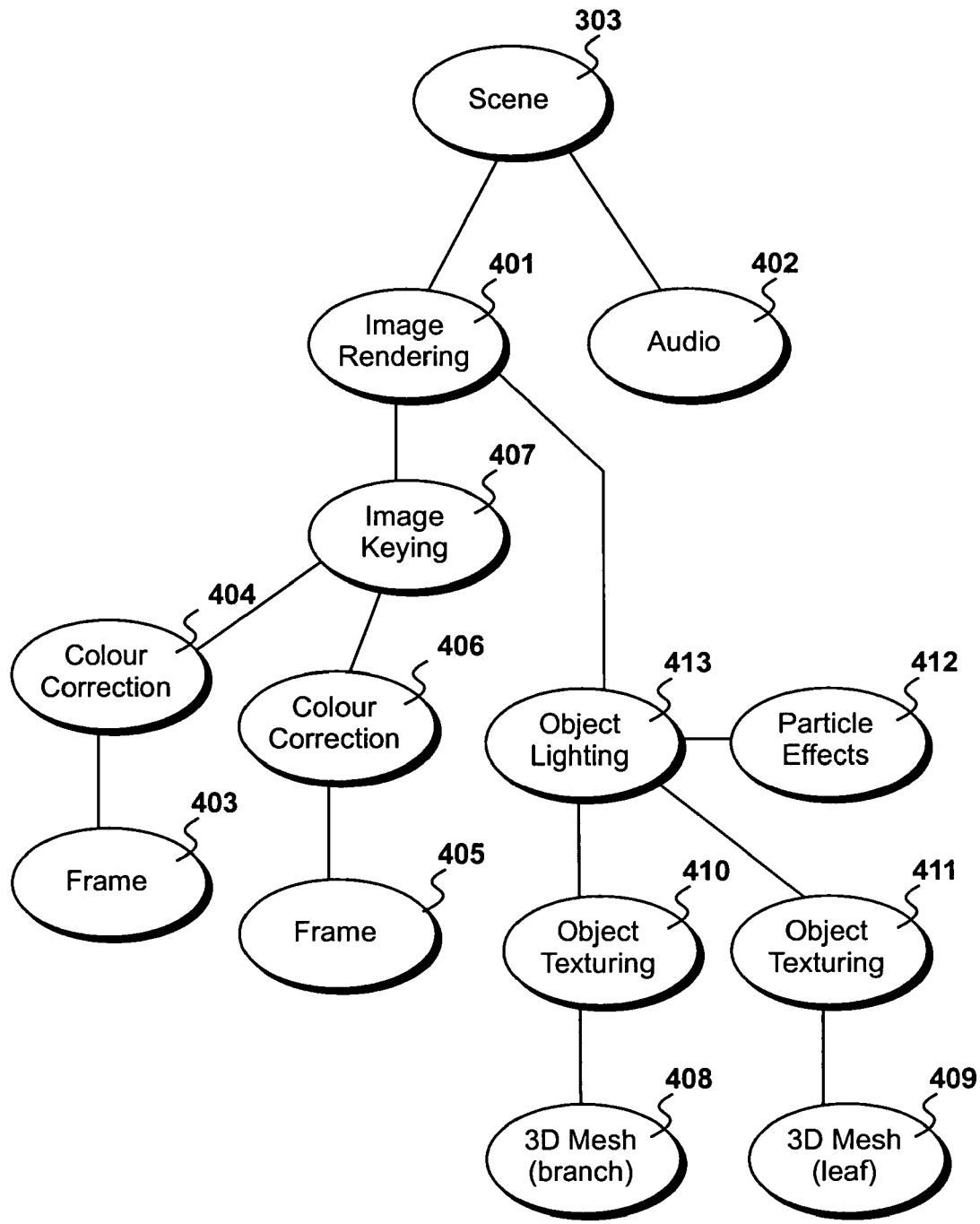
FIG. 4 further illustrates the image data and structure thereof shown in FIG. 3.

A simplified example of the process tree of sequence 303 is shown in FIG. 4. Process trees generally consist of sequentially-linked processing nodes, each of which specifies a particular processing task required in order to eventually achieve an output in the form of a composited frame or a sequence of a plurality thereof, in the example sequence 303. Traditionally, the output sequence 303 will comprise both image data and audio data. Accordingly, the composited scene 303 will thus require the output from an image-rendering node 401 and the output of a sound-mixing node 402. The image-rendering node 401 calls on a plurality of further processing nodes to obtain all of the input data it requires to generate the output image data, or sequence of composited frames. In the example, the desired output image data 303 includes a plurality of frames within which talent and three-dimensional computer-generated objects are composited into a background portraying a water cascade.

The image rendering node 401 thus initially requires a sequence of background frames 403, which are digitised 65 mm film frames portraying said water cascade. Each such digitised frame is subsequently processed by a colour correction processing node 404, for instance to optimise the various levels of brightness, contrast, hue and saturation with which the red, green and blue colour components defining each pixel of said digitised frames are configured. Moreover, image rendering node 401 also requires a sequence of frames 405, which are similar digitised 65 mm film frames but portraying alternative image data, for instance talent filmed against a blue or green highly-saturated background, to be keyed with the color-corrected image data output by node 404. Again, each such digitised frame is subsequently processed by a colour correction processing node 406. Within the process tree, image rendering note 401 thus requires an image-keying node 407 to key the colour-corrected (404) frame sequence 403 with the colour-corrected (406) frame sequence 404.

In the example, the task of the image editor is to implement foliage, understood as branches having leaves, in and around said water cascade, but which were absent from the original water cascade location committed to film. Consequently, said foliage has to be created and seamlessly incorporated into each "water cascade" frame. Within the process tree, image rendering note 401 thus also requires the respective outputs of a first three-dimensional object-generating node 408, the task of which is to output branches as meshes of polygons and of second three-dimensional object-generating node 409, the task of which is to generate leaves as meshes of polygons.

Preferably, a "wood" texture is applied by a first object-texturing node 410 to the "branch" meshes generated by node 408 and a "leaf" texture is applied by a second object-texturing node 411 to the "leaf" object meshes generated by node 409. A particle effects-generating node 412 then generates artificial, realistic water spray to be super imposed over the above three-dimensional, textured objects in order to enhance the realism of the final output 303, e.g the impression conveyed to audience 302 that the above foliage generated by nodes 408 to 411 was committed to film at the same time as the water cascade. A final object-lighting processing node 413 collates the output data of nodes 408 to 412 in order to further accentuate said realism of said output scene 303 by artificially lighting said computer-generated foliage and water spray, preferably according to location light parameters obtained at the time of filming the water cascade or, alternatively, by means of light maps which are well known to those skilled in the art.

Upon receiving the output of nodes 407 and 413, image rendering node 401 can subsequently output the colour-corrected frames 403, 405 keyed at 407 using conventional image keying processes, such as for instance chroma-keying or luma-keying, with the above-described lit and textured three-dimensional objects, whereby the output of said image rendering node 401 is provided to scene node 303 for outputting final, composited sequence including audio 402. The scene graph shown in FIG. 4 is very small is so restricted for the purpose of not obscuring the present description unnecessarily but it will be readily apparent to those skilled in the art that such scene graphs usually involve hundreds or even thousands of such hierarchical data processing nodes.

FIG. 5

Figure 5:
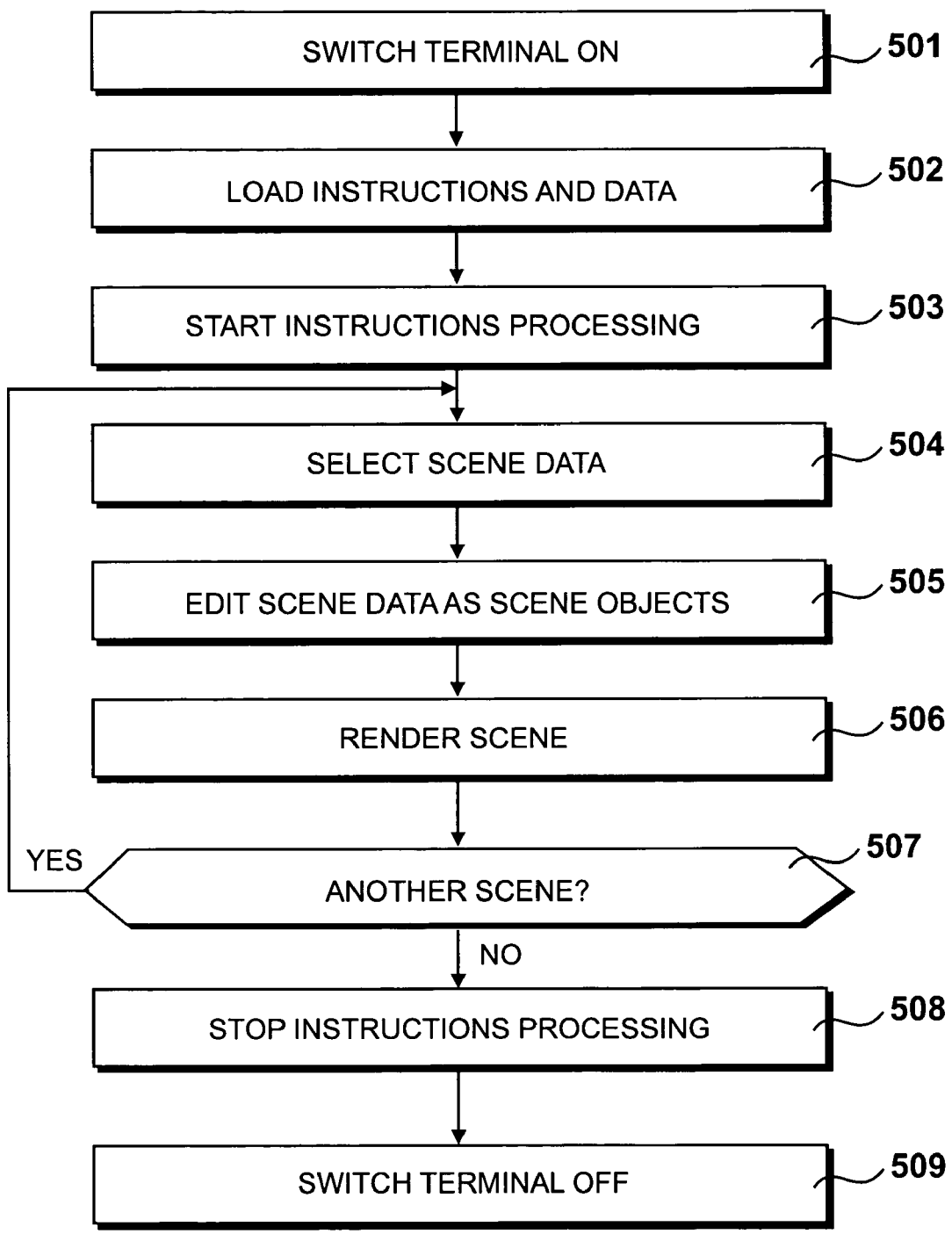
FIG. 5 details the processing steps according to which an image editor operates the image processing system shown in FIGS. 1 and 2 according to the present invention, including a step of editing image data shown in FIGS. 3 and 4.

The processing steps according to which artist 100 may operate the image processing system shown in FIGS. 1 and 2 according to the present invention are described in FIG. 5.

At step 501, artist 100 switches on the image processing system and, at step 502, an instruction set is loaded from hard disk drive 208, DVD ROM 110 by means of the optical reading device 109 or magnetic disk 112 by means of magnetic reading device 111, or even a network server accessed by means of network card 213.

Upon completing the loading of step 502 of instructions set into memory 207, CPUs 201, 202 may start processing said set of instructions, also known as an application, at step 503. User 100 may then select a scene graph such as described in FIG. 4 at step 504. Upon performing the selection of step 504, artist 100 may now perform a variety of processing functions upon the image data of the scene graph at step 505, whereby a final composite image frame may then output at step 506 by means of rendering the edited scene.

At step 507, a question is asked as to whether the image data of another scene requires editing at step 505 and rendering at step 506. If the question of step 507 is answered positively, control is returned to step 504, whereby another scene may then be selected. Alternatively, if the question of 507 is answered negatively, signifying that artist 100 does not require the functionality of the application loaded at step 502 anymore and can therefore terminate the processing thereof at step 508. Artist 100 is then at liberty to switch off the image processing system 101 at step 509.

FIG. 6

The contents of main memory 207 subsequently to the selection step 504 of a scene are further detailed in FIG. 6.

An operating system is shown at 601 which comprises a reduced set of instructions for CPUs 201, 202 the purpose of which is to provide image processing system 101 with basic functionality. Examples of basic functions include for instance access to files stored on hard disk drive 208 or DVD/CD-ROM 110 or ZIP(tm) disk 112 and management thereof, network connectivity with a network server and framestore 107, interpretation and processing of the input from keyboard 105, mouse 106 or graphic tablet 102, 103. In the example, the operating system is Windows XP(tm) provided by the Microsoft corporation of Redmond, Wash., but it will be apparent to those skilled in the art that the instructions according to the present invention may be easily adapted to function under different other known operating systems, such as IRIX(tm) provided by Silicon Graphics Inc or LINUX, which is freely distributed.

An application is shown at 602 which comprises the instructions loaded at step 502 that enable the image processing system 101 to perform steps 503 to 507 according to the invention within a specific graphical user interface displayed on VDU 104. Application data is shown at 603 and 604 and comprises various sets of user input-dependent data and user input-independent data according to which the application shown at 602 processes image data. Said application data primarily includes a data structure 603, which references the entire processing history of the image data as loaded at step 504 and will hereinafter be referred to as a scene graph. According to the present invention, scene structure 603 includes a scene hierarchy which comprehensively defines the dependencies between each component within an image frame as hierarchically-structured data processing nodes, as will be further described hereinbelow.

Scene structure 603 comprises a plurality of node types 605, each of which provides a specific functionality in the overall task of rendering a scene according to step 506. Said node types 605 are structured according to a hierarchy 606, which may preferably but not necessarily take the form of a database, the purpose of which is to reference the order in which various node types 605 process scene data 604.

Further to the scene structure 603, application data also includes scene data 604 to be processed according to the above hierarchy 606 in order to generate one or a plurality of image frames, i.e. the parameters and data which, when processed by their respective data processing nodes, generate the various components of a final composite image frame.

A number of examples of scene data 604 are provided for illustrative purposes only and it will be readily apparent to those skilled in the art that the subset described is here limited only for the purpose of clarity. Said scene data 604 may include image frames 607 acquired from framestore 107, for instance a background image frame digitised from film and subsequently stored in framestore 107, portraying a TV set and a foreground image frame digitised from film and subsequently stored in framestore 107, portraying a TV presenter.

Said scene data 604 may also include audio files 608 such as musical score or voice acting for the scene structure selected at step 504. Said scene data 604 may also include pre-designed three-dimensional models 609, such as a camera object required to represent the pose of the rendering origin and frustrum of a rendering node within the compositing environment, which will be described further below in the present description. In the example, scene data 604 includes lightmaps 610, the purpose of which is to reduce the computational overhead of CPUs 201, 202 when rendering the scene with artificial light sources. Scene data 604 finally include three-dimensional location references 611, -the purpose of which is to reference the position of the scene objects edited at step 505 within the three-dimensional volume of the scene compositing environment.

FIG. 7

Figure 6:
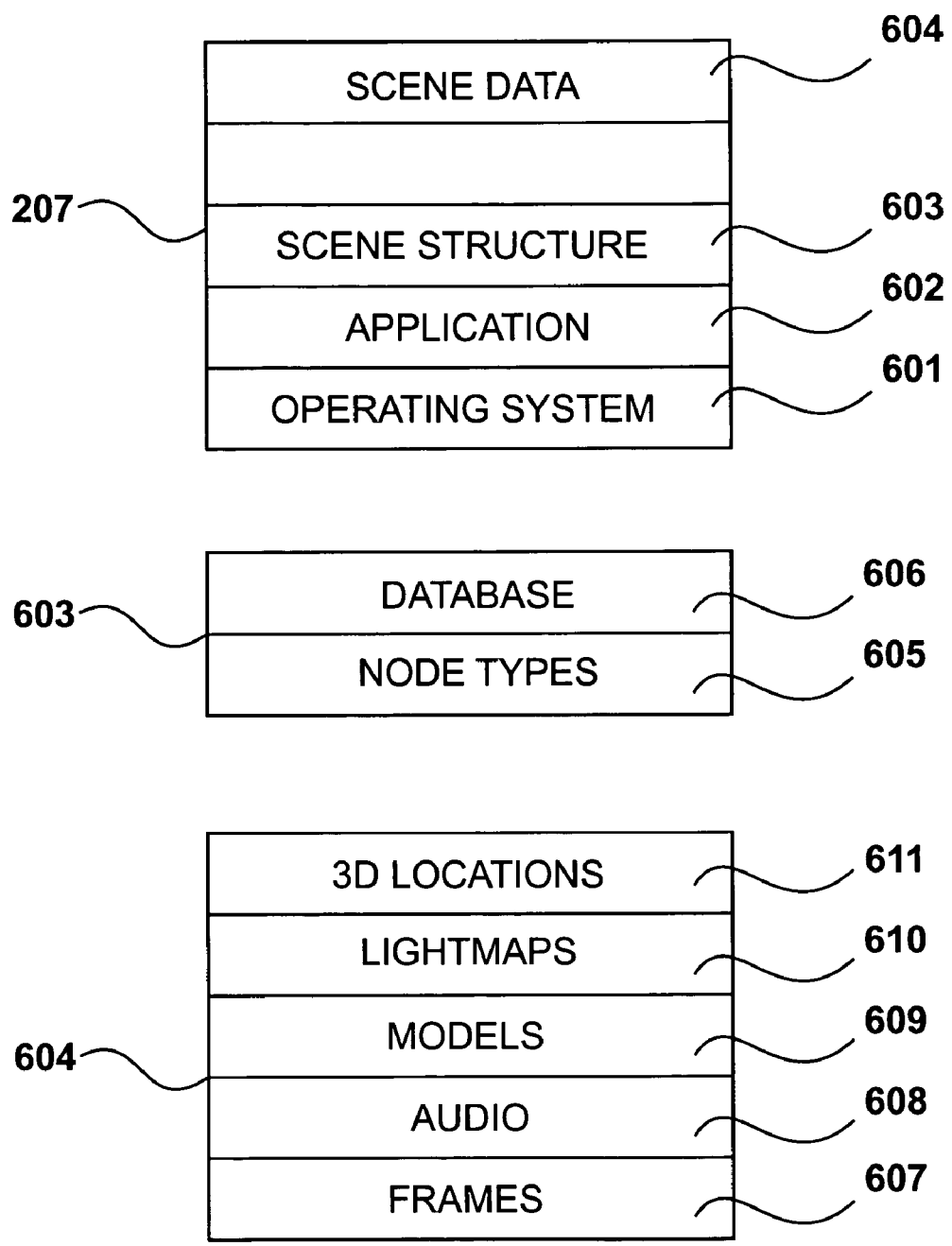
FIG. 6 details the contents of the memory shown in FIG. 2 after performing the step of starting the processing of an application shown in FIG. 5, including said application.

Scene nodes 303 to 413 are presented to the user as a scene graph, the structure 603 of which is preferably loaded at step 504 in the form of a database 606 shown in FIG. 6, a portion of which is illustrated in FIG. 7.

Nodes have a number of properties, a number of which are hierarchical. Preferably, each node has a unique identification within the scene graph registered in column 701. Columns 702 and 703 respectively reference the children and parent hierarchical dependencies of each node. The specific type of node is registered in column 704, for instance as the image processing function performed at said node, and its name is registered at column 705, wherein said name may be edited by user 100.

Referring to the description of FIG. 4, the node identified as 0001 is final output node 303 as shown in row 706. It has children nodes identified as ranging from node 0002 to node 0014, which are nodes 401 and 402 respectively. As shown in rows 707 and 708, nodes 0002 and 0014 both respectively identify node 0001 as their parent. Similarly, node 0002 has children nodes identified as ranging from node 0003 to node 0013, which are nodes 407 and 413 respectively. As shown in rows 709 and 710 respectively, node 0003 identifies node 0002 as its parent and node 0013 identifies node 0008 as its parent, wherein said node 0008 identifies node 0002 as its parent as shown at 711. In effect, a cascading hierarchy is obtained wherein each node registers its children range in column 702 and its immediate parent in column 703, wherein said cascading hierarchy mirrors the "traversal" processing by application 602 of scene graph.

What is meant by traversal processing is that, with reference to the scene graph of the example, application 602 first processes node 303, which then invokes output from node 401, which itself invokes output from node 407, itself calling output from node 404, wherein said node 404 invokes output from node 403. Upon receiving output from node 404, node 407 subsequently invokes output from node 406 which invokes output from node 405. Upon receiving output from node 406, node 407 outputs keyed image data to node 401, which subsequently invokes output from node 413, itself invoking output from node 410 which invokes output from node 408, and so on and so forth until all of the required output data has been generated by traversing the entire graph substantially from top to bottom and left to right and node 303 may then output final scene data. The hierarchical dependencies registered in this way are thus always self-consistent. It will be appreciated by the skilled user that the example described with reference to FIGS. 3 and 4 and 7 is for illustrative purposes only. A real process tree typically comprises thousands of nodes.

FIG. 8

Figure 8:
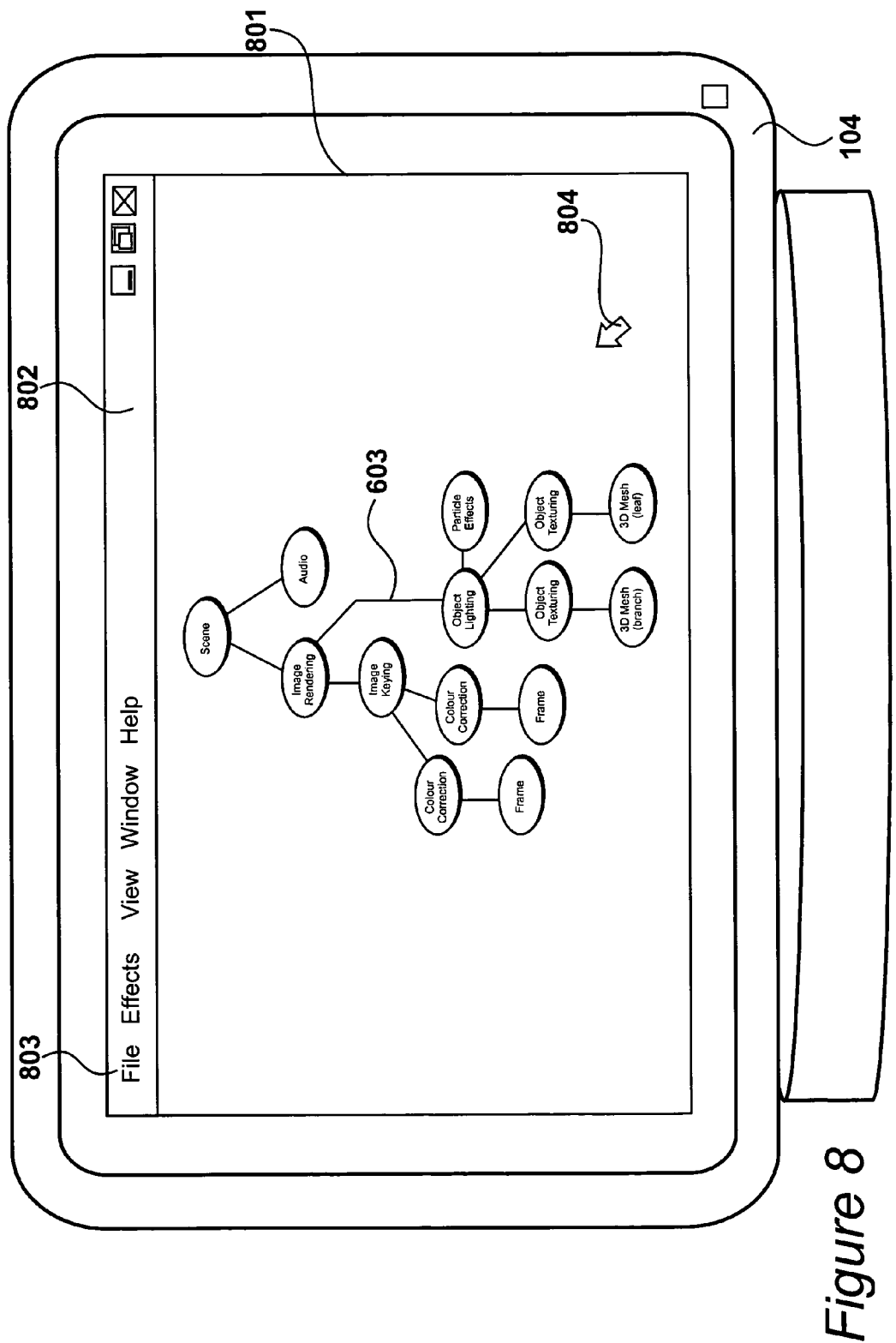
FIG. 8 shows the default graphical user interface of the application shown in FIG. 6.

The default graphical user interface of application 602 output to display 104 upon completing the application loading and starting steps 502 and 503 and the scene graph selection of step 504 is shown in FIG. 8.

According to the present invention, the image data shown in FIGS. 3 to 7 may be edited by an image editor with image processing application 602 processed by image processing system 101. Upon completing loading and starting steps 502, 503, said system 101 outputs a default graphical user interface (GUI) 801 of the image processing application 602 to display means 104 for interaction by said user therewith, within which representations of image-processing functions are displayed for selection and are alternatively named menus, icons and/or widgets by those skilled in the art.

GUI 801 is preferably configured with a conventional menu toolbar 802, having a plurality of function representations thereon. A first representation 803 defines a "File" management menu which, when selected by artist 100 by means of positioning a GUI pointer 804 thereon with translating mouse 106 or stylus 102 over tablet 103 and subsequently effecting a mouse click or tapping said stylus 102 over said tablet 103, generates a conventional "drop-down" sub-menu (not shown) configured with further representations of file management functions, such as an "open graph" function for instance. In the example, user 100 performs the above interaction in order to select image data 603, 604 at step 504 as a scene graph as described in FIGS. 4, 6 and 7, which is then accessed at framestore 107 and stored in memory 207.

Upon completing the population of database 606 further described in FIG. 7 at step 504, application 602 may then process dependencies 702, 703 in order to output the structure 603 to GUI 802 as data processing nodes 303 to 413, each of which is displayed at a hierarchically-correct position within the workspace 805 of said GUI 801, whereby user 100 can interact with any of said nodes by way of translating pointer 804 thereon and effecting a node selection with a logical interrupt operation, such as a mouse click of mouse 106 or tapping stylus 102 onto tablet 103.

Scene graph 603 is shown configured as a top-to-bottom processing pipeline, in accordance with three-dimensional ("3D") processing techniques that are employed in modern image data processing systems such as described in FIGS. 1, 2 and 5 to 8, by means of which the "traversal" processing of hierarchical data processing nodes described in FIG. 7 can be intuitively represented for user 100 to interact therewith. However, 3D processing has only very recently been implemented in image frame compositing applications, wherein image artists have long been used to image processing in alternative 2D and 4D dimensions and have developed corresponding skillsets that take time and therefore resources to adapt to this new development.

FIG. 9

Figure 9:
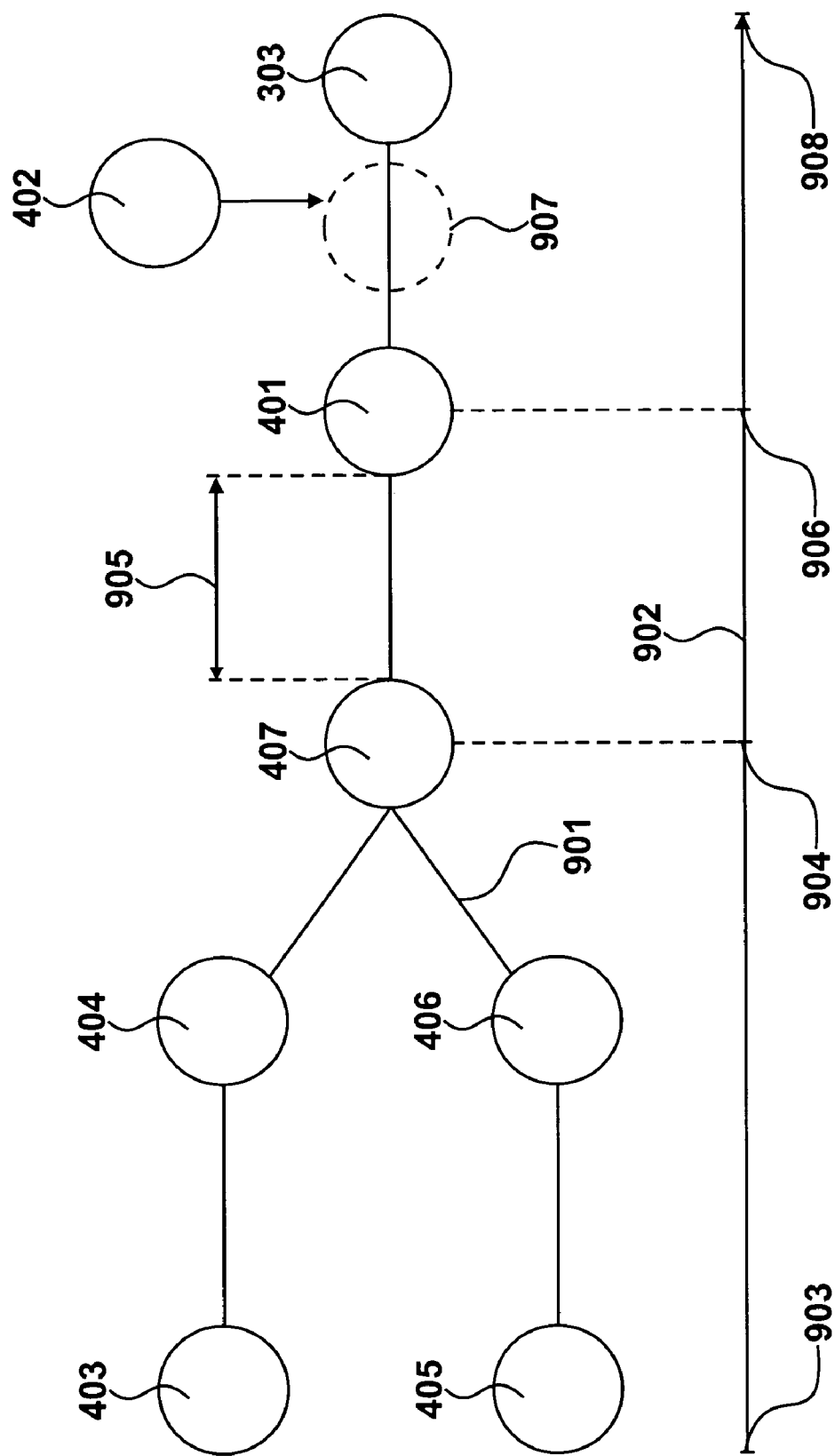
FIG. 9 illustrates a 2D scene graph for processing image data according to the prior art.

Image processing in a traditional 2D dimension is shown in FIG. 9 by means of the scene graph shown in FIG. 4 configured according to the known prior art.

Two-dimensional image processing scene graphs, such as graph 901 usually represent a number of image processing functions performed sequentially, wherein said sequence follows the processing of source image data over a period of time 902. Configuring the scene graph of FIG. 4 according to the prior art system illustrated in FIG. 9 therefore results in said scene graph 901, which is consulted by an image artist from the left to the right. Accordingly, the leftmost nodes are frame nodes 403, 405 which respectively output background and foreground source image frames at time 903. Said image frames are concurrently output such that they may reach keying node 407 at time 904 in a synchronized manner.

In the 2D system of the prior art, additional special effect such as those generated by nodes 408 to 413 are then implemented in keyed image frames output by node 407 over a period of time 905, whereby rendering node 401 can output final image data at time 906. In the 2D system according to the prior art still, audio data output by node 402 is subsequently associated with the output of said node 401 shown at 907 and a final output sequence including image data and audio data is obtained at scene node 303 at time 908. An artist editing image data in the 2D system is therefore used to base edit decisions upon the order in which functions contribute to the processing of an image frame, e.g. in relation to the processed contents of said frame at any point of processing cycle 902.

Whilst the final output sequence generated according to the prior art scene graph 901 would be identical to the equivalent final output sequence generated by the node 303 shown in FIG. 4, it can firstly be clearly observed that the "left-to-right" consultation that is a core element of an image artist's skill set when used to edit data in such a prior art system differs substantially from the "top-to-bottom" consultation required in a 3D-based system. Secondly, the processing sequence described by scene graph 901 also differs substantially from the equivalent processing sequence shown in FIG. 4 and further described as the "traversal" of FIGS. 7 and 8. Having regard to the fact that a scene graph such as is shown in FIG. 8 contains at least nine hundred nodes, the above problems are compounded.

FIG. 10

Figure 10:
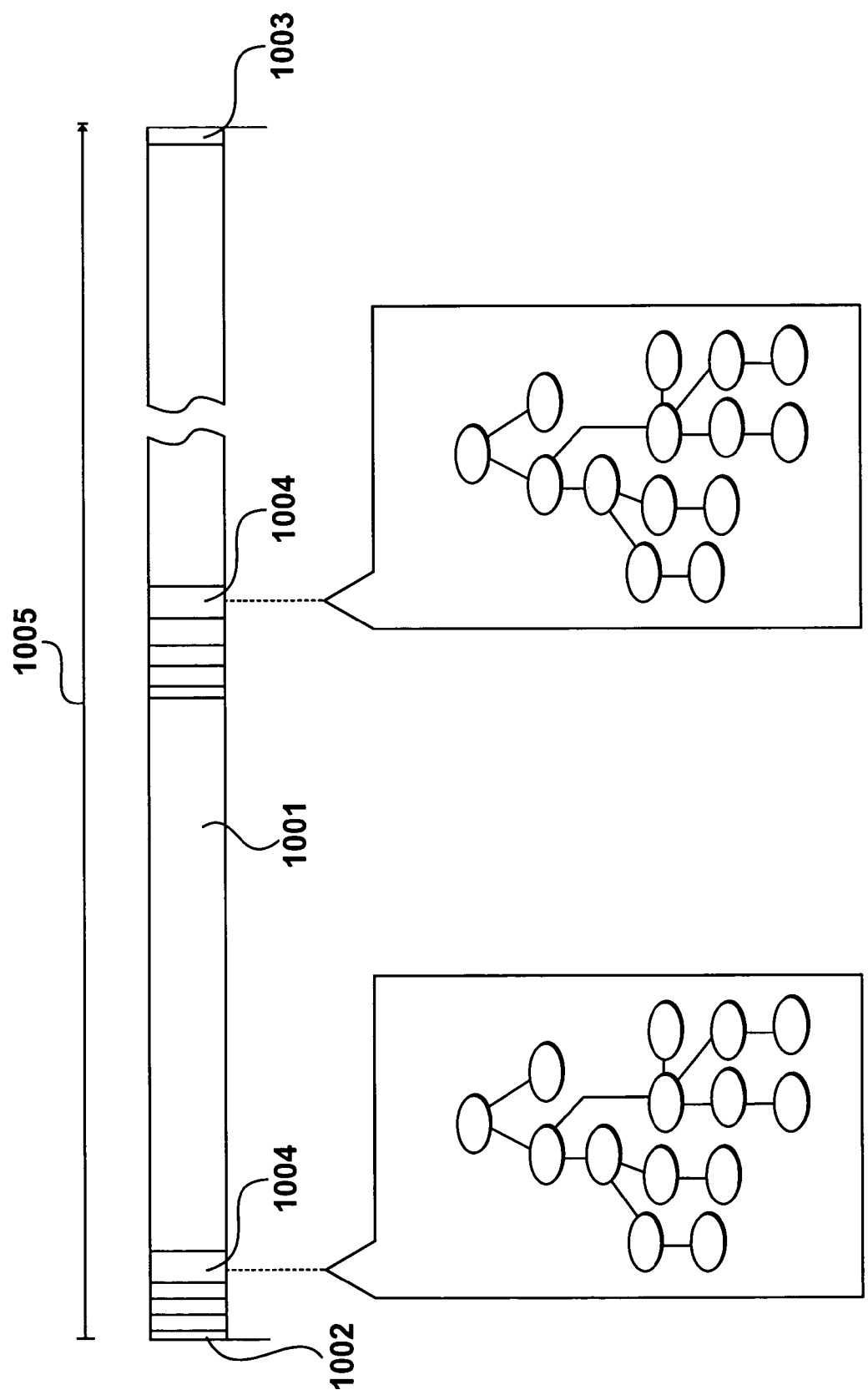
FIG. 10 illustrates a 4D scene graph for processing image data according to the prior art.

Image processing in a traditional 4D dimension is shown in FIG. 10 by means of a timeline configured according to the known prior art.

The time-based system of the prior art shown in FIG. 10 differs from the 2D system described in FIG. 9, which also includes a time reference 902, in that instead of representing the image data processing as sequential functions, it represents the total number of processing cycles 903 to 908 that have to be performed in order to output a complete sequence 1001 of final output image frames including audio data. In other words, said complete sequence 1001 is represented as a timeline, the -origin 1002 of which corresponds to the first frame of said sequence and the end 1003 of which corresponds to the last frame thereof.

Having regard to the description of time period 902 in FIG. 9, each subdivision 1004 of timeline 1001 corresponds to a frame output at time 908, i.e. each such subdivision 1004 corresponds to a processing period 902. Consequently, the time period 1005 of reference in a 4D system of the prior art corresponds to an actual period of time that may be expressed in hours, minutes, seconds and/or image frames, whereas the time period 902 corresponds to one processing cycle. An artist editing image data in the 4D system is therefore used to base edit decisions upon the contents of an image frame at a position in time of the complete sequence, e.g. image processing functions are "inserted" as effects are required at a given moment of the sequence.

Whilst the final output sequence 1001 generated with the 4D system of the prior art would be identical to the equivalent final output sequence generated by the node 303 shown in FIG. 4, it can firstly be clearly observed that the actual frame-based or time-based consultation that is a core element of an image artist's skill set when used to edit data in such a prior art system differs substantially from the "top-to-bottom" consultation required in a 3D-based system. Secondly, the processing sequence described by a timeline also differs substantially from the equivalent processing sequence shown in FIG. 4 and further described as the "traversal" of FIGS. 7 and 8. Having regard to the fact that a scene graph such as is shown in FIG. 8 contains at least nine hundred nodes, the above problems are compounded.

The present invention overcomes the respective problems of the 2D system of the prior art shown in FIG. 9 and the 4D system of the prior art shown in FIG. 10 when a user must adapt their skill set to a 3D system by providing a user-operable scene graph node by means of which user 100 may alternatively represent portions of the scene structure 603 in any of a 2D, 3D or 4D environment.

FIG. 11

Figure 11:
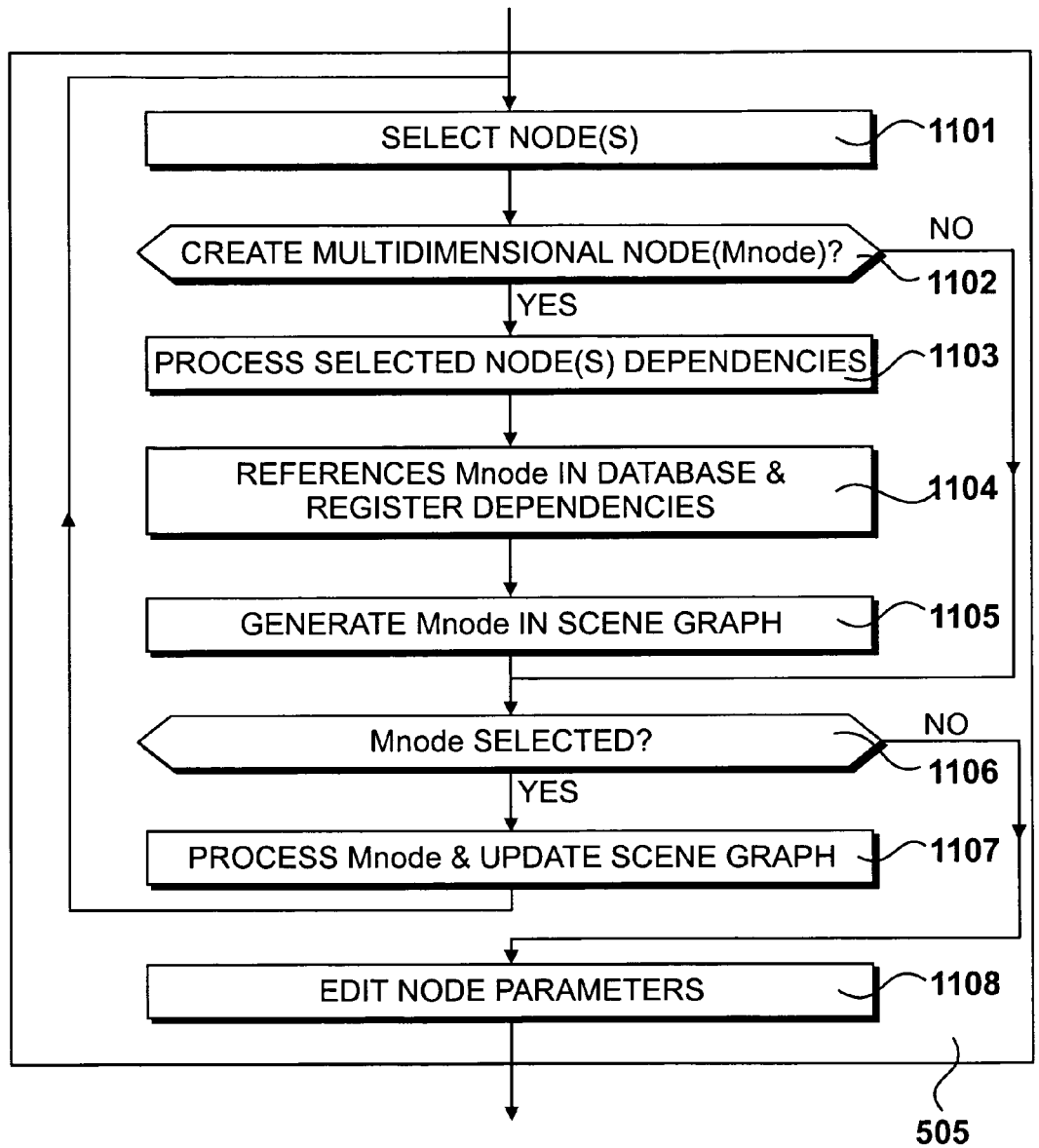
FIG. 11 further details the step of editing scene data shown in FIG. 5 in a system configured to the present invention, including a step of processing respective dependencies and a step of updating a scene graph.

The step 505 of editing scene data in a system configured to the present invention is further detailed in FIG. 11.

At step 1101 user 100 preferably selects one or a plurality of nodes of scene structure 603 within GUI 801 by means of mouse 106 or stylus 102 and tablet 103, for instance with translating pointer 804 diagonally across the portion of GUI 801 displaying nodes 403 to 407 according to conventional "click-and-drag" technique. At step 1102, a question is asked as to whether user 100 provides input data to system 101 processed by application 602 to create a multidimensional node, or group node Mnode. If the question of step 1102 is answered positively, application 602 processes the respective dependencies of the node or nodes selected at step 1103 that are stored in database 606, whereby an Mnode is referenced in said database 606 at step 1104 and its dependencies 702, 703 registered therein. Upon completing said referencing step 1104, application 602 preferably generates a representation of said Mnode in said scene structure 603 at step 1105, whereby said Mnode is thus displayed in GUI 801.

Alternatively, if the question of step 1102 is answered negatively, whereby a second question is asked at step 1106 as to whether the node selected at step 1101 is a Mnode. If the question of step 1106 is answered positively, the processing function according to the present invention is processed by application 602 at step 1107, whereby the dimensional representation of the scene graph displayed within GUI 801 is updated to another dimensional representation, whereby said other dimension is selected according to user input, such that user 100 may interact with said alternative scene graph at step 1101. Alternatively, if the question of step 1106 is answered negatively, control proceeds to step 1108, wherein user 100 may now edit the parameters of the image data processing node selected at step 1101.

FIG. 12

Figure 12:
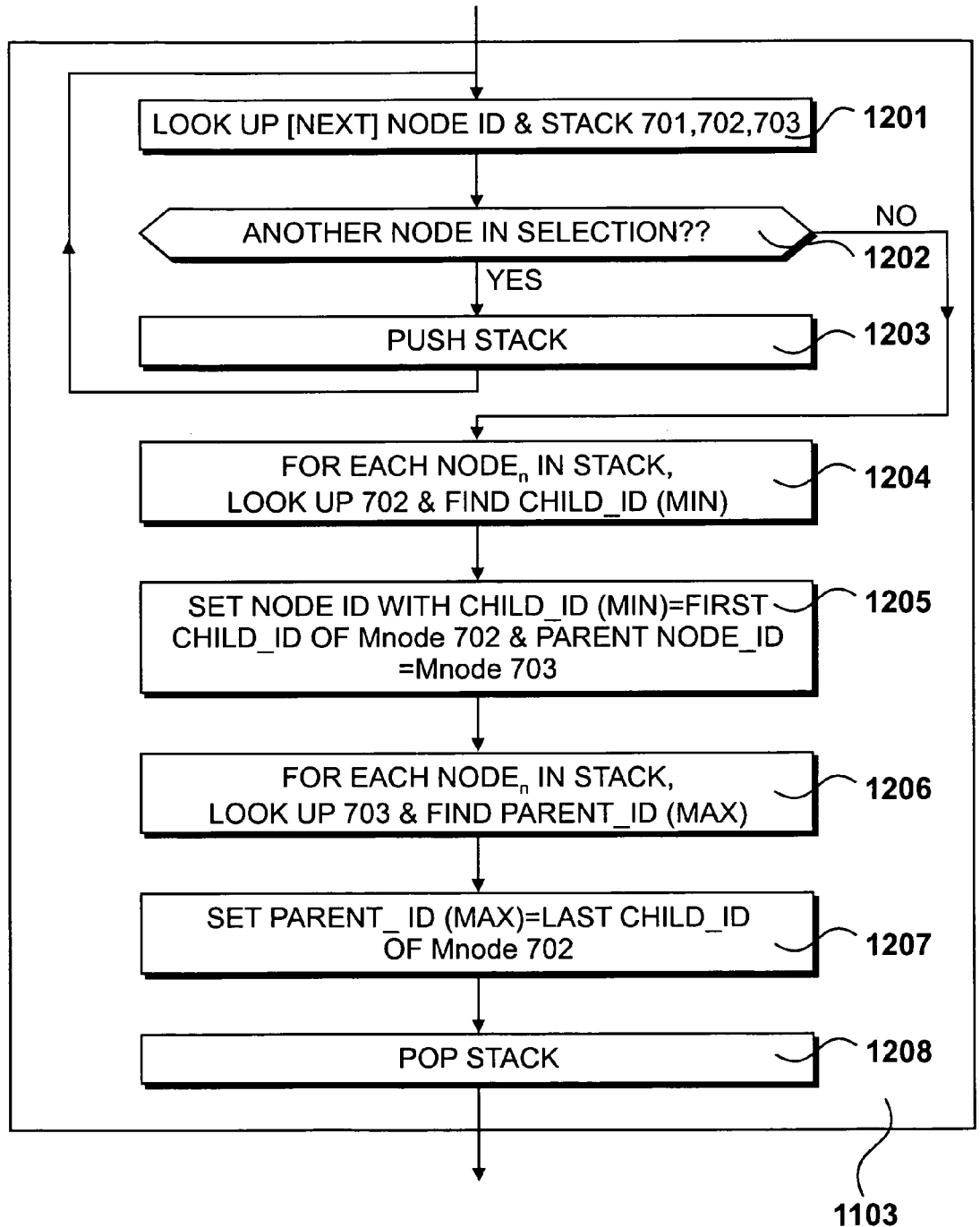
FIG. 12 further details the step of processing respective dependencies shown in FIG. 11.

The step 1103 of processing the respective dependencies 702, 703 of each node selected at step 1101 is further detailed at FIG. 12.

At step 1201, application 602 identifies a first node of the number of nodes selected at step 1101 and temporarily stores its respective node ID 701, children dependency data 702 and parent dependency data 703 in a portion of memory 207 configured as a memory stack. At step 1202, a question is asked as to whether there remains another node to be identified in the selection. If the question of step 1202 is answered positively, application 602 pushes said memory stack at the next step 1203 and control is returned to step 1201 to identify said next node. Eventually, all of the selected nodes are identified and their respective ID and dependency data stacked, whereby the question of step 1202 is answered negatively.

At step 1204, application 602 iteratively reads the stacked children dependency data 702 in order to identify the lowest child reference of the topmost parent in the selection such that, at step 1205, the node ID of said topmost parent node is set as the first child reference 702 of the multidimensional node Mnode. The respective parent node of said topmost parent in the selection is logically set as the parent 703 of the multidimensional node Mnode.

At step 1206, application 602 iteratively reads the stacked parent dependency data 703 in order to identify the node with the highest parent reference in the selection such that, at step 1207, the node ID of said identified node is set as the last child reference 702 of the multidimensional node Mnode. Upon completing step 1207, application 602 pops the stack at step 1208 as ID and dependency processing are complete, wherein the multidimensional node Mnode of the present invention is configured with an automatic ID, children dependency data 702 and parent dependency data 703, whereby said multidimensional node Mnode may now be referenced in database 606 according to step 1104.

FIG. 13

Figure 13:
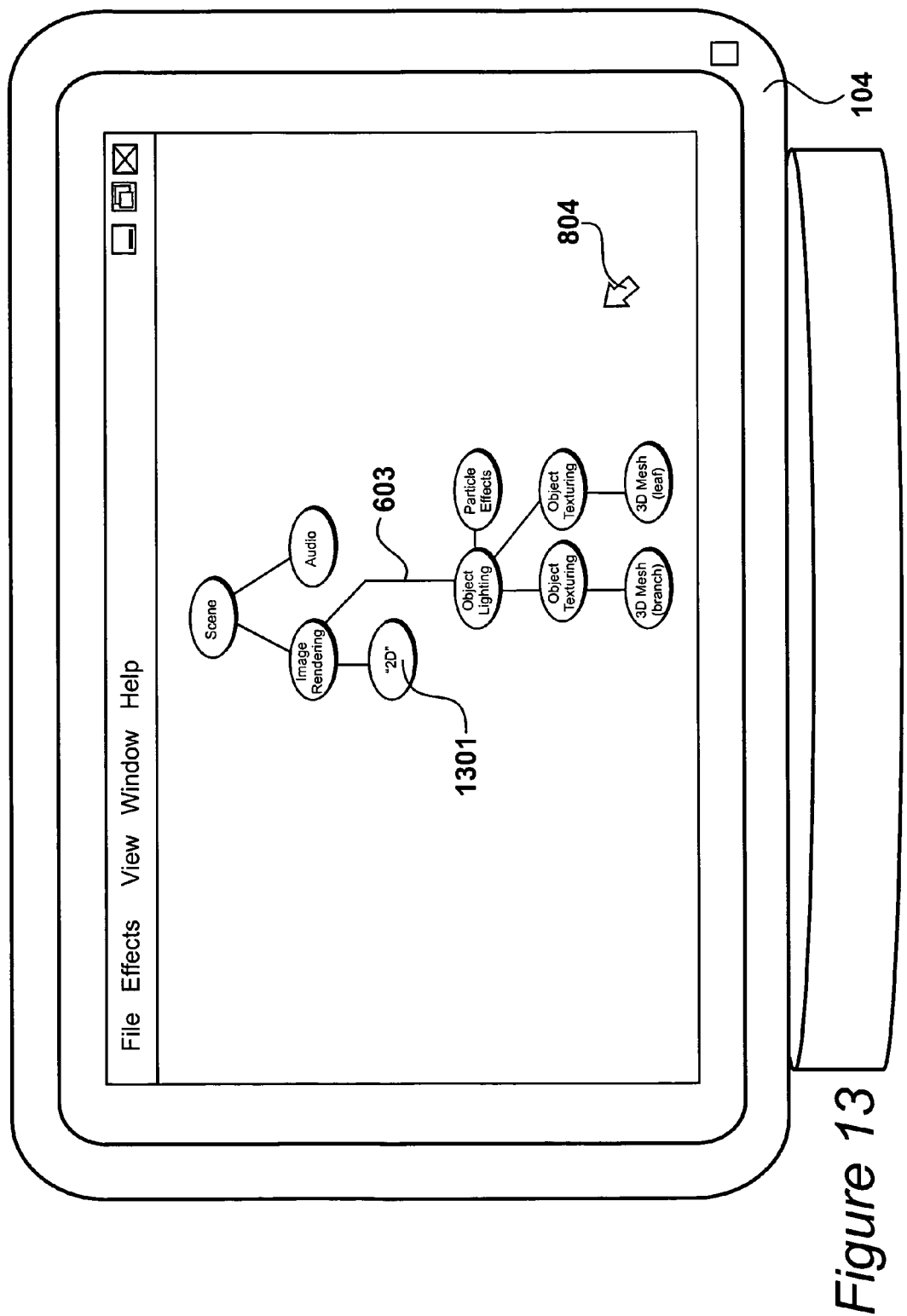
FIG. 13 shows the graphical user interface of the application shown in FIG. 8, including a multidimensional node.

The scene graph shown in FIG. 8 is again shown within the GUI of application 602 configured according to the present invention in FIG. 13.

Scene graph 603 is shown configured with nodes 303 and 401 to 413, but wherein user 100 has elected to create a multidimensional node Mnode 1301, for instance because said user is more familiar with a 2D scene graph and has difficulty understanding the representation of the frame data processing performed by 3D scene graph nodes 403 to 407.

According to the preferred embodiment of the present invention, user 100 thus selects the portion of GUI 801 wherein said nodes 403 to 407 are displayed then provide input data to answer question 1102 positively, for instance by means of a function key of keyboard 105 or the spacebar thereof. According to the present description, application 602 subsequently stacks the data 701, 702 and 703 of each of said nodes 403 to 407, wherein it identifies node 407 (node ID 0003, 709) as the node with the lowest child reference (node ID 0004) and having a parent node (node ID 0002). Mnode 1301 is therefore configured with node 401 (node ID 0002, 707) as its parent and node 407 (node ID 0003, 709) as its first child. Thereafter, application 602 identifies node 405 (node ID 0007) as the node with the highest parent reference (node ID 0006). Mnode 1301 is therefore configured with node 405 as its last child reference 702.

Mnode 1301 is subsequently referenced in database 606, its dependencies 701, 702, 703 registered therein, and representation of scene graph 603 within GUI 801 updated according to step 1105, wherein in the Figure, nodes 403 to 407 have been replaced by said Mnode 1301.

FIG. 14

Figure 14:
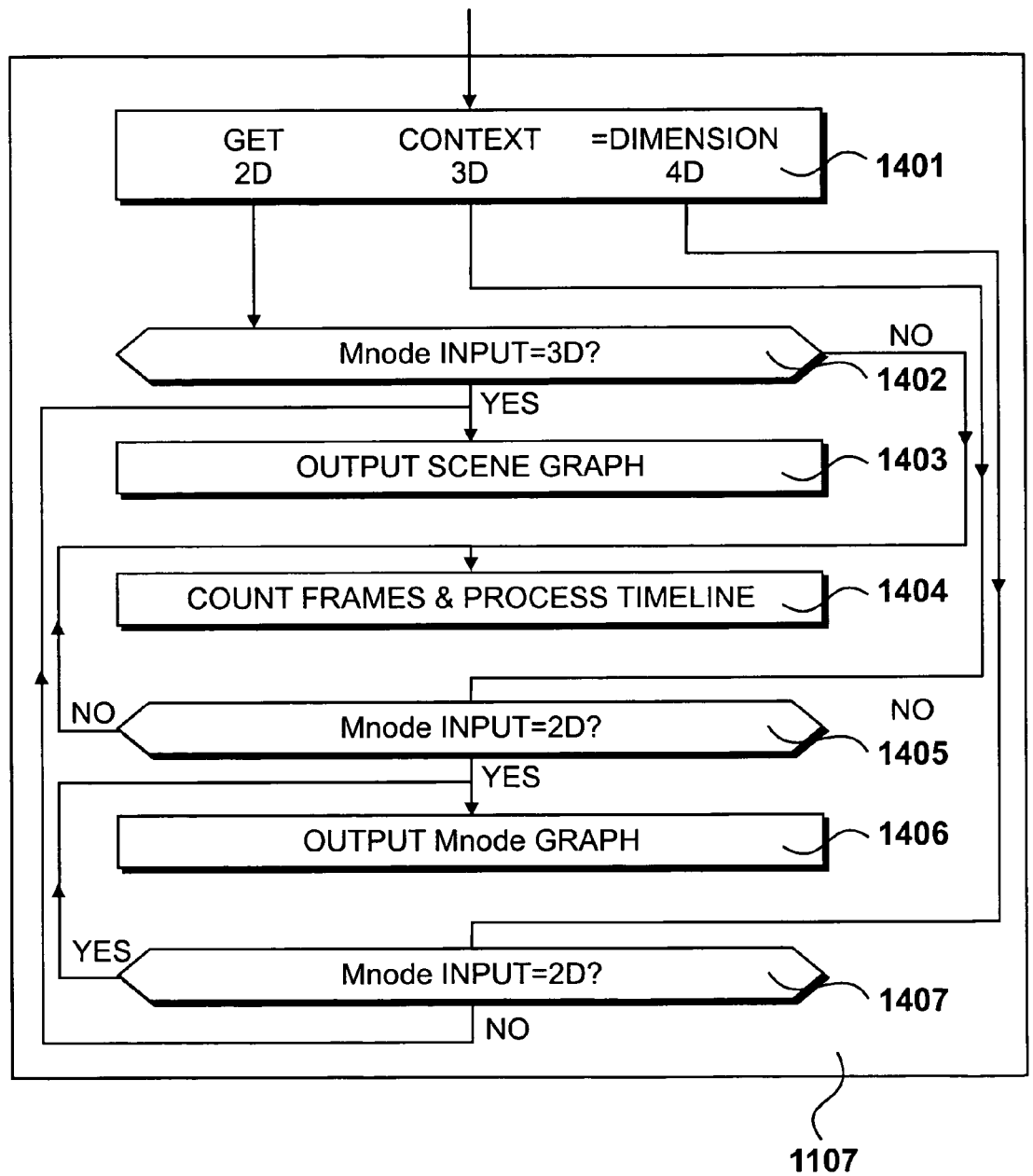
FIG. 14 further details the step of updating a scene graph 603 shown in FIG. 11.

The step 1107 of processing the Mnode attributes and update scene graph 603 as shown in FIG. 8 according to the present invention is further detailed in FIG. 14.

At step 1401, application 602 first obtains the current dimension of the representation of scene graph 603 in GUI 801, by invoking the last state of the dimension function represented by Mnode 1301 which, by default, is 3D. According to the preferred embodiment of the present invention, said dimension may be either 2D, 3D or 4D.

If the current dimension obtained at step 1401 is 2D, a first question is asked at step 1402, as to whether input data generated by user 100 upon selected Mnode 1301 according to step 1106 instructs a dimensional shift to 3D. If the question of step 1402 is answered positively, application 602 outputs scene graph 603 to GUI 801 as the 3D scene graph including Mnode 1301 at step 1403, as described in FIG. 13. Alternatively, if the question of step 1402 is answered negatively, said input data is processed as instructing a dimensional shift to the third 4D dimension, whereby in the example, the total number of frames respectively output by frame nodes 403, 405 are obtained and a corresponding timeline, such as timeline 1001, is output to said GUI 801 at step 1404.

If the current dimension obtained at step 1401 is 3D, a second question is asked at step 1405, as to whether input data generated by user 100 upon selected Mnode 1301 according to step 1106 instructs a dimensional shift to 2D. If the question of step 1405 is answered positively, application 602 processes the dependencies 702, 703 of said Mnode 1301 to output a partial 2D scene graph to GUI 801, such as scene graph 901, at step 1406. Alternatively, if the question of step 1405 is answered negatively, control is returned to step 1404 and said input data is processed as instructing a dimensional shift to the third 4D dimension, whereby in the example, the total number of frames respectively output by frame nodes 403, 405 are obtained and a corresponding timeline, such as timeline 1001, is output to said GUI 801 at said step 1404.

If the current dimension obtained at step 1401 is 4D, a third question is asked at step 1407, as to whether input data generated by user 100 upon selected Mnode 1301 according to step 1106 instructs a dimensional shift to 2D. If the question of step 1407 is answered positively, application 602 processes the dependencies 702, 703 of said Mnode 1301 to output a partial 2D scene graph to GUI 801, such as scene graph 901, at step 1406. Alternatively, if the question of step 1407 is answered negatively, control is returned to step 1403 and said input data is processed as instructing a dimensional shift to the third 3D dimension, whereby in the example, application 602 outputs scene graph 603 to GUI 801 as the 3D scene graph including Mnode 1301 at step 1403, as described in FIG. 13.

Upon performing any of scene graph dimensional adjustments according to steps 1403, 1404 or 1406, the Mnode function is initialised back to step 1101, as described in FIG. 11.

FIG. 15

Figure 15:
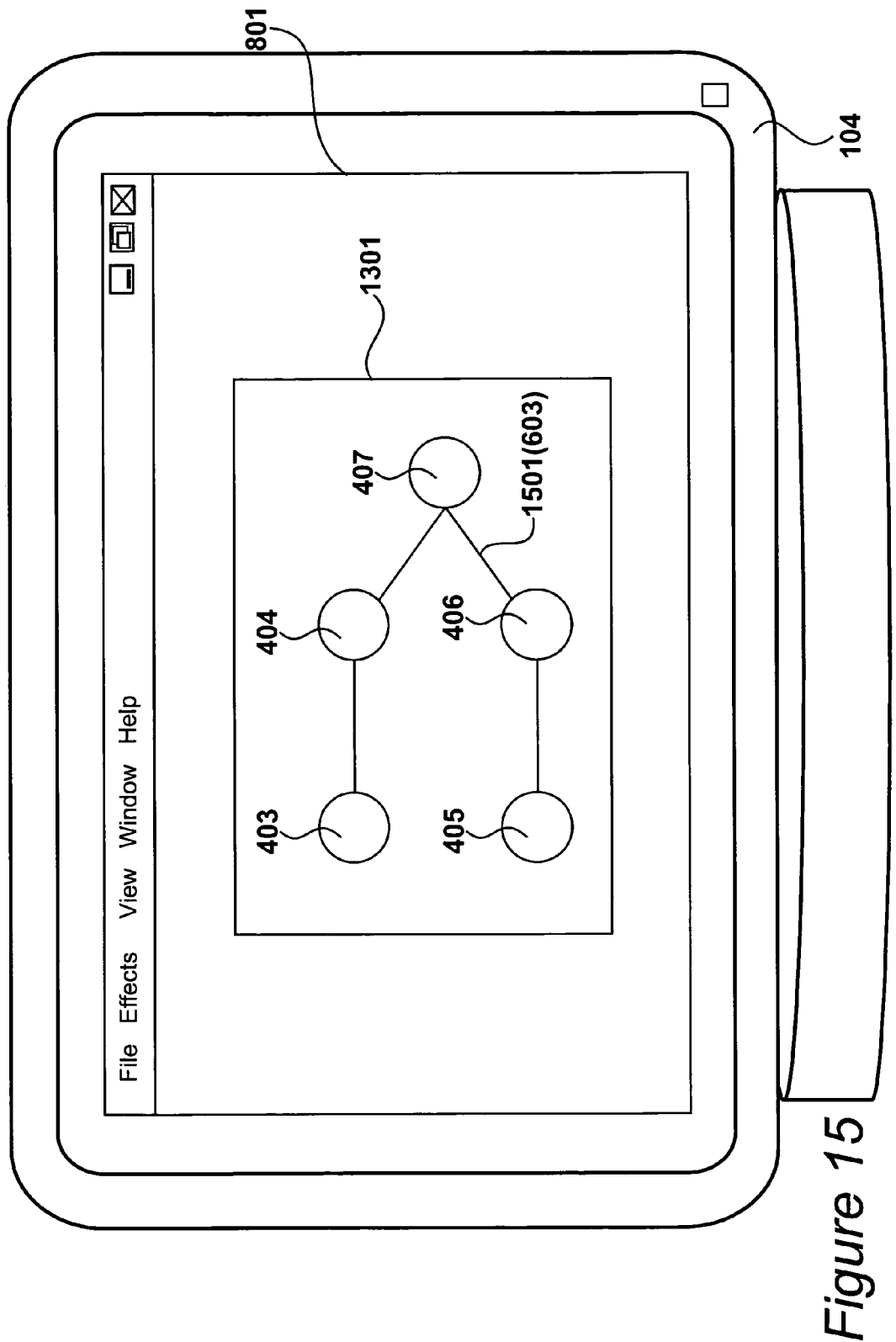
FIG. 15 shows the graphical user interface of the application shown in FIG. 13, wherein the scene graph shown in FIGS. 13 and 14 is updated according to the present invention.

The scene graph shown in FIG. 13 is again shown within the GUI of application 602 configured according to the present invention in FIG. 15.

With reference to the description of FIGS. 13 and 14, upon user 100 selecting Mnode 1301 according to step 1106, application 602 obtains the dimensional context shown in FIG. 13 as 3D and, with reference to user 100 having a mostly 2D-based skill set, user 100 provides input data to select a 2D scene graph dimensional shift.

The question of step 1405 is therefore answered positively, whereby the respective dependencies of Mnode 1301 stored in database 606 according to step 1105, which were derived from frame processing nodes 403 to 407 according to steps 1201 to 1208, are processed by application 602 in order to output a 2D scene graph 1501 comprising only the 3D data processing nodes selected at step 1101. However, said 3D data processing nodes are now structured as a conventional, 2D "left-to-right" scene graph, thus a portion of the default 3D scene graph in a modern image processing application is configured as a 2D scene graph, whereby user 100 having a mostly 2D-based skill set may now rapidly and intuitively perform image data editing in a dimensional environment within which he or she is cost-effective.

The invention claimed is:

1. Apparatus for processing image data, comprising processing means, memory means, display means and manually operable input means, wherein said memory means stores said image data and instructions, said image data and said instructions configure said processing means to perform the steps of outputting said image data to said display means as a hierarchical structure of image data processing nodes having respective hierarchical properties, said structure being configured with a dimension, wherein said dimension comprises either: (1) a three-dimensional (3D) hierarchical structure representing a top-to-bottom processing pipeline of images based on the image data processing nodes, (2) a two-dimensional (2D) image processing scene graph with image processing functions performed sequentially, or (3) a four-dimensional (4D) timeline view illustrating a total number of processing cycles that have to be performed to output a complete sequence of final output image frames based on a timeline sequence;

in response to selecting a plurality of said nodes by way of said input means, generating a multidimensional group node having hierarchical properties processed from said respective properties;

replacing said selected plurality of nodes with said group node in said hierarchical structure; and in response to selecting said group node, displaying the selected group node in said hierarchical structure as a different one of the dimensions.

2. The apparatus of claim 1 further comprising a database within which properties of each node in the hierarchical structure are registered.

3. A method of processing image data, said method comprising the steps of outputting image data to display means as a hierarchical structure of image data processing nodes having respective hierarchical properties, said structure being configured with a dimension, wherein said dimension comprises either: (1) a three-dimensional (3D) hierarchical structure representing a top-to-bottom processing pipeline of images based on the image data processing nodes, (2) a two-dimensional (2D) image processing scene graph with image processing functions performed sequentially, or (3) a four-dimensional (4D) timeline view illustrating a total number of processing cycles that have to be performed to output a complete sequence of final output image frames based on a timeline sequence;

in response to selecting a plurality of said nodes, generating a multidimensional group node having hierarchical properties processed from said respective properties;

replacing said selected plurality of nodes with said group node in said hierarchical structure; and in response to selecting said group node, displaying the selected group node in said hierarchical structure as a different one of the dimensions.

4. The method of claim 3 further comprising registering properties of each node of the hierarchical structure in a database.

5. A computer-readable medium having computer-readable instructions for processing image data executable by a computer such that, when executing said instructions, said computer will perform the steps of:

outputting image data to display means as a hierarchical structure of image data processing nodes having respective hierarchical properties, said structure being configured with a dimension, wherein said dimension comprises either: (1) a three-dimensional (3D) hierarchical structure representing a top-to-bottom processing pipeline of images based on the image data processing nodes, (2) a two-dimensional (2D) image processing scene graph with image processing functions performed sequentially, or (3) a four-dimensional (4D) timeline view illustrating a total number of processing cycles that have to be performed to output a complete sequence of final output image frames based on a timeline sequence;

in response to selecting a plurality of said nodes, generating a multidimensional group node having hierarchical properties processed from said respective properties;
replacing said selected plurality of nodes with said group node in said hierarchical structure; and
in response to selecting said group node, displaying the selected group node in said hierarchical structure as a different one of the dimensions.

6. The computer-readable medium of claim 5 wherein said computer is further configured to perform the step of registering properties of each node of the hierarchical structure in a database.

* * * * *